(12) United States Patent
Rock et al.

(10) Patent No.: US 8,192,824 B2
(45) Date of Patent: Jun. 5, 2012

(54) TEMPERATURE RESPONSIVE SMART TEXTILE

(75) Inventors: Moshe Rock, Brookline, MA (US);
Veronica Hunt, Medford, MA (US);
Brian Durant, Medford, MA (US);
David Gilbert, Andover, MA (US)

(73) Assignees: MMI-IPCO, LLC, Lawrence, MA (US); Mide Technology Corporation, Medford, MA (US)

( * ) Notice: Subject to any disclaimer, the term of this patent is extended or adjusted under 35 U.S.C. 154(b) by 890 days.

(21) Appl. No.: 11/835,632

(22) Filed: Aug. 8, 2007

(65) Prior Publication Data

US 2008/0057261 A1   Mar. 6, 2008

Related U.S. Application Data

(60) Provisional application No. 60/940,775, filed on May 30, 2007, provisional application No. 60/840,813, filed on Aug. 29, 2006.

(51) Int. Cl.
*B32B 3/00*   (2006.01)
*D04B 1/14*   (2006.01)
*D04B 9/12*   (2006.01)
*D03D 27/00*  (2006.01)

(52) U.S. Cl. ............ 428/97; 428/92; 428/913; 66/194; 66/202; 442/308; 442/309; 442/311

(58) Field of Classification Search ............ 428/92, 428/97, 913; 442/308, 309, 311; 66/194, 66/202
See application file for complete search history.

(56) References Cited

U.S. PATENT DOCUMENTS

| | | | |
|---|---|---|---|
| 179,661 A | 7/1876 | Lee |
| 308,244 A | 11/1884 | Fishel |
| 601,489 A | 3/1898 | Tim |
| 1,118,792 A | 11/1914 | Nicholas |
| 1,252,187 A | 1/1918 | Shane |
| 1,350,169 A | 8/1920 | Mullane |
| 1,973,419 A | 9/1934 | Trageser |
| 2,391,535 A | 12/1945 | Zelano |
| D170,723 S | 10/1953 | Secosky et al. |
| 2,715,226 A | 8/1955 | Weiner |
| 3,045,243 A | 7/1962 | Lash et al. |
| 3,078,699 A | 2/1963 | Huntley |
| 3,086,215 A | 4/1963 | Di Paola |
| 3,153,793 A | 10/1964 | Lepore |

(Continued)

FOREIGN PATENT DOCUMENTS

CA   2579144   *   4/2006

(Continued)

OTHER PUBLICATIONS

Cook et al. Shape Memory Polymer Fiber for Comfort Wear, National Textile Center Annual Report, Nov. 2005.*

(Continued)

*Primary Examiner* — Jenna Johnson
(74) *Attorney, Agent, or Firm* — Fish & Richardson, P.C.

(57) ABSTRACT

A textile fabric has at least one raised surface incorporating multicomponent fibers formed of at least a first material and a second material disposed in side-by-side relationship. The first material and the second material exhibit differential thermal elongation, which causes the multicomponent fibers to bend or curl and reversibly recover in response to changes in temperature, thereby adjusting insulation performance of the textile fabric in response to ambient conditions.

75 Claims, 15 Drawing Sheets

U.S. PATENT DOCUMENTS

| | | | |
|---|---|---|---|
| 3,265,529 A | 8/1966 | Caldwell et al. | |
| 3,296,626 A | 1/1967 | Ludwikowski | |
| 3,458,390 A | 7/1969 | Ando et al. | 161/177 |
| 3,594,262 A | 7/1971 | Magidson | |
| 3,607,591 A | 9/1971 | Hansen | |
| 3,626,714 A | 12/1971 | Blore | |
| 3,710,395 A | 1/1973 | Spano et al. | |
| 3,737,368 A | 6/1973 | Such et al. | |
| 3,761,962 A | 10/1973 | Myers | |
| 3,801,987 A | 4/1974 | Thompson, Jr. | |
| 3,857,753 A | 12/1974 | Hansen | |
| 3,931,067 A | 1/1976 | Goldberg et al. | |
| 3,971,234 A | 7/1976 | Taylor | |
| 4,126,903 A | 11/1978 | Horton | |
| 4,185,327 A | 1/1980 | Markve | |
| 4,195,364 A | 4/1980 | Bengtsson et al. | |
| 4,267,710 A | 5/1981 | Imamichi | |
| 4,275,105 A | 6/1981 | Boyd et al. | |
| 4,351,874 A | 9/1982 | Kirby | |
| 4,392,258 A | 7/1983 | O'Neill | |
| 4,418,524 A | 12/1983 | Ito et al. | |
| 4,513,451 A | 4/1985 | Brown | |
| 4,541,426 A | 9/1985 | Webster | |
| 4,608,715 A | 9/1986 | Miller et al. | |
| 4,619,004 A | 10/1986 | Won | |
| 4,638,648 A | 1/1987 | Gajjar | |
| 4,722,099 A | 2/1988 | Kratz | |
| 4,804,351 A | 2/1989 | Raml et al. | |
| 4,807,303 A | 2/1989 | Mann et al. | |
| 4,887,317 A | 12/1989 | Phillips et al. | |
| 4,895,751 A | 1/1990 | Kato et al. | |
| 4,896,377 A | 1/1990 | Ferdi | |
| 4,996,723 A | 3/1991 | Huhn et al. | |
| 5,033,118 A | 7/1991 | Lincoln | |
| 5,093,384 A | 3/1992 | Hayashi et al. | 521/159 |
| 5,095,548 A | 3/1992 | Chesebro, Jr. | |
| 5,105,478 A | 4/1992 | Pyc | |
| 5,128,197 A | 7/1992 | Kobayashi et al. | 428/225 |
| 5,139,832 A | 8/1992 | Hayashi et al. | 428/35.5 |
| 5,141,805 A * | 8/1992 | Nohara et al. | 442/334 |
| 5,155,199 A | 10/1992 | Hayashi | 528/65 |
| 5,192,600 A | 3/1993 | Pontrelli et al. | |
| 5,206,080 A | 4/1993 | Tashiro et al. | |
| 5,211,827 A | 5/1993 | Peck | |
| 5,232,769 A | 8/1993 | Yamato et al. | |
| 5,282,277 A | 2/1994 | Onozawa | |
| 5,367,710 A | 11/1994 | Karmin | |
| 5,469,581 A | 11/1995 | Uthoff | |
| 5,515,543 A | 5/1996 | Gioello | |
| 5,582,893 A | 12/1996 | Bottger et al. | |
| 5,636,533 A | 6/1997 | Hunneke et al. | |
| 5,645,924 A | 7/1997 | Hamilton | |
| 5,659,895 A | 8/1997 | Ford, Jr. | |
| 5,683,794 A | 11/1997 | Wadsworth et al. | |
| 5,704,064 A | 1/1998 | van der Sleesen | |
| 5,722,482 A | 3/1998 | Buckley | |
| 5,727,256 A | 3/1998 | Rudman | |
| 5,735,145 A | 4/1998 | Pernick | |
| 5,763,335 A | 6/1998 | Hermann | |
| 5,787,502 A | 8/1998 | Middleton | |
| 5,792,714 A | 8/1998 | Schindler et al. | |
| 5,809,806 A | 9/1998 | Yoon et al. | |
| 5,834,093 A | 11/1998 | Challis et al. | |
| 5,836,533 A | 11/1998 | Hallamasek | |
| 5,853,879 A | 12/1998 | Takamiya et al. | |
| 5,856,245 A | 1/1999 | Caldwell et al. | |
| 5,868,724 A | 2/1999 | Dierckes, Jr. et al. | |
| 5,869,172 A | 2/1999 | Caldwell | |
| 5,874,164 A | 2/1999 | Caldwell | |
| 5,887,276 A | 3/1999 | Lee | |
| 5,901,373 A | 5/1999 | Dicker | |
| 5,908,673 A | 6/1999 | Muhlberger | |
| 5,912,116 A | 6/1999 | Caldwell | |
| 5,925,441 A | 7/1999 | Blauer et al. | |
| 5,939,485 A | 8/1999 | Brombert et al. | |
| 5,955,188 A | 9/1999 | Pushaw | |
| 6,015,764 A | 1/2000 | McCormack et al. | |
| 6,018,819 A | 2/2000 | King et al. | |
| 6,025,287 A | 2/2000 | Hermann | |
| 6,040,251 A | 3/2000 | Caldwell | |
| 6,061,829 A | 5/2000 | Gunn | |
| 6,066,017 A | 5/2000 | Max et al. | |
| 6,083,602 A | 7/2000 | Caldwell et al. | |
| 6,110,588 A | 8/2000 | Perez et al. | |
| 6,211,296 B1 | 4/2001 | Frate et al. | |
| 6,241,713 B1 | 6/2001 | Gross et al. | |
| 6,248,710 B1 | 6/2001 | Bijsterbosch et al. | |
| 6,253,582 B1 | 7/2001 | Driggars | |
| 6,268,048 B1 | 7/2001 | Topolkaraev et al. | |
| 6,279,161 B1 | 8/2001 | Johnston | |
| 6,308,344 B1 | 10/2001 | Spink | |
| 6,312,784 B2 | 11/2001 | Russell et al. | |
| 6,319,558 B1 | 11/2001 | Willemsen | |
| 6,332,221 B1 | 12/2001 | Gracey | |
| 6,339,845 B1 | 1/2002 | Burns et al. | |
| 6,361,451 B1 | 3/2002 | Masters et al. | |
| D457,709 S | 5/2002 | Davis | |
| 6,403,216 B1 | 6/2002 | Doi et al. | |
| 6,430,764 B1 | 8/2002 | Peters | |
| 6,521,552 B1 | 2/2003 | Honna et al. | |
| 6,550,341 B2 | 4/2003 | van Schoor et al. | |
| 6,550,474 B1 | 4/2003 | Anderson et al. | |
| 6,640,715 B1 | 11/2003 | Watson et al. | |
| 6,647,549 B2 | 11/2003 | McDevitt et al. | |
| 6,698,510 B2 | 3/2004 | Serra et al. | |
| 6,723,378 B2 | 4/2004 | Hrubesh et al. | |
| 6,726,721 B2 | 4/2004 | Stoy et al. | |
| D491,713 S | 6/2004 | Wilson, III | |
| 6,756,329 B1 | 6/2004 | Umino et al. | |
| 6,766,817 B2 | 7/2004 | da Silva | |
| 6,767,850 B1 | 7/2004 | Tebbe | |
| 6,770,579 B1 | 8/2004 | Dawson et al. | |
| 6,787,487 B1 | 9/2004 | Takeda et al. | |
| 6,802,216 B2 | 10/2004 | van Schoor et al. | |
| 6,812,268 B2 | 11/2004 | Schneider et al. | |
| 6,855,422 B2 | 2/2005 | Magill et al. | |
| 6,918,404 B2 | 7/2005 | da Silva | |
| 6,927,316 B1 | 8/2005 | Faries, Jr. et al. | |
| 7,066,586 B2 | 6/2006 | da Silva | |
| 2002/0132540 A1 | 9/2002 | Soerens et al. | |
| 2002/0164474 A1 | 11/2002 | Buckley | |
| 2002/0189608 A1 | 12/2002 | Raudenbush | |
| 2003/0010486 A1 | 1/2003 | Serra et al. | |
| 2003/0087566 A1 | 5/2003 | Carlyle et al. | |
| 2003/0114810 A1 | 6/2003 | Weber | |
| 2003/0182705 A1 | 10/2003 | Spongberg | |
| 2003/0208831 A1 | 11/2003 | Lazar et al. | |
| 2004/0025985 A1 | 2/2004 | van Schoor et al. | |
| 2004/0131838 A1 | 7/2004 | Serra et al. | |
| 2004/0132367 A1 | 7/2004 | Rock | |
| 2004/0158910 A1 | 8/2004 | Bay | |
| 2004/0176005 A1 | 9/2004 | Nordstrom | |
| 2005/0204448 A1 | 9/2005 | Wise et al. | |
| 2005/0204449 A1 | 9/2005 | Baron et al. | |
| 2005/0208266 A1 | 9/2005 | Baron et al. | |
| 2005/0208283 A1 | 9/2005 | Baron et al. | |
| 2005/0208850 A1 | 9/2005 | Baron et al. | |
| 2005/0208857 A1 | 9/2005 | Baron et al. | |
| 2005/0208859 A1 | 9/2005 | Baron et al. | |
| 2005/0208860 A1 | 9/2005 | Baron et al. | |
| 2005/0246813 A1 | 11/2005 | Davis et al. | |
| 2005/0250400 A1 | 11/2005 | Hsu | |
| 2006/0179539 A1 | 8/2006 | Harber | |
| 2006/0223400 A1 | 10/2006 | Yasui et al. | |
| 2006/0277950 A1 | 12/2006 | Rock | 66/169 |
| 2008/0057261 A1 | 3/2008 | Rock | |
| 2008/0057809 A1 | 3/2008 | Rock | |

FOREIGN PATENT DOCUMENTS

| | | |
|---|---|---|
| DE | 1 435 981 | 3/1969 |
| DE | 27 02 407 | 7/1978 |
| DE | G 85 33 733.1 | 5/1986 |
| DE | 196 19 858 | 11/1997 |
| EP | 826083 | 4/2000 |
| EP | 1 050 323 | 11/2000 |
| EP | 1054095 | 11/2000 |
| EP | 826082 | 3/2001 |

| | | |
|---|---|---|
| EP | 1 329 167 | 7/2003 |
| EP | 1 752 571 | 2/2007 |
| EP | 1 306 475 | 3/2007 |
| EP | 1 803 844 | 7/2007 |
| GB | 2 108 822 A | 5/1983 |
| GB | 2 193 429 A | 2/1988 |
| GB | 2254044 | 9/1992 |
| GB | 2333724 | 7/2002 |
| GB | 2 403 146 | 12/2004 |
| JP | 60-252746 | 12/1985 |
| JP | 60-252756 | 12/1985 |
| JP | 61-216622 | 9/1986 |
| JP | 62-162043 | 7/1987 |
| JP | 8-113804 | 7/1996 |
| JP | 2001-49513 | 2/2001 |
| JP | 2002-180342 | 6/2002 |
| JP | 2003-41462 | 2/2003 |
| JP | 2004-360094 | 12/2004 |
| JP | 2005-36374 | 2/2005 |
| SE | 198 705 | 3/1965 |
| WO | 91/09544 | 7/1991 |
| WO | 92/16434 | 10/1992 |
| WO | 99/05926 | 2/1999 |
| WO | WO2004/011046 | 2/2004 |
| WO | 2004/113599 | 12/2004 |
| WO | 2004/113601 | 12/2004 |
| WO | WO2005/007962 | 1/2005 |
| WO | 2005/010258 | 2/2005 |
| WO | 2005/038112 | 4/2005 |
| WO | 2005/095692 | 10/2005 |
| WO | 2005/110135 | 11/2005 |
| WO | WO2006/002371 | 1/2006 |
| WO | 2006/041200 | 4/2006 |
| WO | 2006/043677 | 4/2006 |
| WO | 2006/044210 | 4/2006 |
| WO | WO 2006/035968 | 4/2006 |
| WO | 2006/090808 | 8/2006 |

OTHER PUBLICATIONS

Hatch, Kathryn L., "Textile Science," West Publishing, 1993, p. 61.
European Search Report Application No. EP 07 25 3372 dated Jan. 1, 2008, (6 pages).
Communication under 37 CFR 1.56(d) from Elson Silva, dated Mar. 24, 2008.
Anonymous, "adidas Clima Cool"; Internet Article, dated Jul. 12, 2005.
Anonymous, "Apparal-Adidas", Internet Article, dated Apr. 21, 2004.
Anonymous, "Loughborough University and adidas join forces to help Olympians beat the heat in Athens", Internet Article, dated Jul. 7, 2004.
International Search Report in corresponding PCT application; International Application No. PCT/US2005/035831, mailed Jan. 26, 2006.
International Search Report in corresponding PCT application; PCT application No. PCT/US2005/005191, mailed Jun. 6, 2005.
Internet printout: http://niketown.nike.com/ Nike Pro Vent Dri-FIT Long Sleeve Top; dated Mar. 22, 2004.
Internet printout: http://niketown.nike.com/ Nike Pro Vent Dri-FIT Short-Sleeve Top, dated Mar. 22, 2004.
Internet printout: http://niketown.nike.com: Dri-FIT One Long Short, dated Mar. 22, 2004.
Internet printout: http://niketown.nike.com: Dri-FIT One Mesh Tank; dated Mar. 22, 2004.
Internet printout: http://niketown.nike.com: Global Nike Sphere Polo, dated Apr. 9, 2004.
Internet printout: http://niketown.nike.com: Global Nike Sphere Top, dated Apr. 9, 2004.
Internet printout: http://niketown.nike.com: Nike Sphere Dry Crew, dated Apr. 9, 2004.
Internet printout: http://niketown.nike.com: Nike Sphere Switchback Long-Sleeve, dated Mar. 22, 2004.
Internet printout: http://niketown.nike.com: Nike Sphere Switchback Short-Sleeve, dated Apr. 9, 2004.
Internet printout: http://niketown.nike.com: Nike Sphere Switchback Long-Sleeve, dated Apr. 9, 2004.
Internet printout: http://niketown.nike.com: Nike Sphere Ultralight Top, dated Apr. 9, 2004.
Internet printout: http://niketown.nike.com: Nike Sphere Ultralight Tank, dated Mar. 22, 2004.
Internet printout: http://niketown.nike.com: Nike Sphere Ultralight Tank, dated Apr. 9, 2004.
Internet printout: http://niketown.nike.com: Nike Sphere Warm-Up, dated Apr. 9, 2004.
Internet printout: http://niketown.nike.com: Nike Sphere Yoked Sleeveless Top, dated Apr. 9, 2004.
Internet printout: http://niketown.nike.com: Nike Sphere Yoked Short-Sleeve Top, dated Apr. 9, 2004.
Internet printout: http://niketown.nike.com: UV Dri-FIT Long-Sleeve Top, dated Mar. 22, 2004.
Internet printout: http://niketown.nike.com: Nike Pro Vent Dri-FIT Sleeveless Top; dated Mar. 22, 2004.
Internet printout: http://realtytimes.com—Agent News and Advice, dated Mar. 24, 2004.
Mitsubishi rayon: Changeable fiber stretches with moisture; Asian Textile Business; Sep. 1, 2003.
Regenold, "Look cool in hot times with Eco-Mesh", Internet Article, dated Apr. 17, 2004.
Weisey, "Grand Canyon Hike", Internet Article; dated Jun. 26, 2000.
Sidawi, Danielle; "Smart Materials Respond to Changing Environments;" R&D Magazine (On-Line Postin); Accessed May 10, 2005 http://rdmag.com ; 8pp including 4pp article + 4pp full text.
European Search Report; Corresponding Application EP 07253370; dated Mar. 12, 2008; 8pp.
Ashley, "Shape Shifter", Scientific American, vol. 284, No. 5, pp. 1-2, 2001.
Brennan, "Suite of Shape-Memory Polymers", Chemical & Engineering, Feb. 5, 2001.
Feng et al., "Dynamics of Mechanical System with a Shape Memory Alloy Bar", Journal of Intelligent Material System and Structures, vol. 7:399-410, Jul. 1996.
Hirai et al., "Shape Memorizing Properties of a Hydrogel of Poly (Vinyl Alcohol", Journal of Applied Polymer Science, vol. 45:1849-1855, 1992.
Lendlein et al. "Biodegradable, Elastic Shape-Memory Polymers for Potential Biomedical Application", Science, vol. 296:1673-1676, May 31, 2002.
Mondal et al., "Temperature Stimulating Shape Memory Polyurethane for Smart Clothing", Indian Journal of Fiber & Textile Research, vol. 31:66-71, Mar. 2006.
Vaia, "Stimuli-Responsive, Shape-Recovery Polymer Nanocomposites", AFRL Technology Horizons, pp. 41-42, Aug. 2004.

* cited by examiner

TEMPERATURE RESPONSIVE SMART TEXTILE

CROSS-REFERENCE TO RELATED APPLICATIONS

This application claims benefit from U.S. Provisional Patent Application 60/940,775, filed May 30, 2007, and U.S. Provisional Patent Application 60/840,813, filed Aug. 29, 2006. The entire disclosures of both of these provisional applications is incorporated herein by reference.

TECHNICAL FIELD

This invention relates to textile fabrics, and more particularly to textile fabrics responsive to changes in ambient temperature.

BACKGROUND

Standard textile fabrics have properties set during fabric construction that are maintained despite changes in ambient conditions and/or physical activity. These standard products are quite effective, especially when layered with other textile fabrics for synergistic effect and enhancement of comfort.

SUMMARY

Textile fabrics with raised surfaces, like fleece, either single face or double face, have different pile heights and different density for different ambient conditions and different activity.

According to one aspect, a textile fabric has at least one raised surface incorporating multicomponent fibers (e.g., bi-component fibers, tri-component fibers, etc.) formed of at least a first material and a second material disposed (e.g., extruded, e.g., co-extruded) in side-by-side relationship. The first material and the second material exhibit differential thermal elongation (e.g., expansion and/or contraction), which causes the multicomponent fibers to bend or curl and reversibly recover in response to changes in temperature, thereby adjusting insulation performance of the textile fabric in response to ambient conditions.

Preferred implementations may include one or more of the following additional features. The first material and the second material exhibit differential thermal elongation in response to changes in temperature over a predetermined range of temperature. Preferably, the predetermined range of temperature in 32° F. to 120° F. More preferably the predetermined range of temperature in 50° F. to 100° F. The raised surface is finished in a form selected from the group consisting of: fleece, velour, pile, shearling, and loop terry. The textile fabric has a knit construction selected from the group consisting of: circular knit construction, single face knit construction, double face knit construction, weft knit construction, and warp knit construction. The textile fabric is a pile fabric having woven or double needle bar Rachel warp knit construction. The multicomponent fibers include bi-component and/or tri-component fibers. The first material is a first polymer, and the second material is a second polymer compatible with the first polymer. The first and/or second material comprises a thermoplastic polymer selected from the group consisting of: polyester, polyurethane, and/or nylon. The first material is a first polymer (e.g., nylon), and the second material is a second polymer (e.g., polyester) non-compatible with the first polymer. The multicomponent fibers can also include a third polymer disposed between the first and second polymers. The third polymer may be more compatible with both of the first and second polymers than the first and second polymers are with each other. The first and second materials may include complementary interlocking surface features adapted to inhibit separation of the first and second materials. The fabric body has a technical face formed by a stitch yarn and a technical back formed by a loop and/or pile yarn including the multicomponent fibers. The thermal fabric can include elastomeric yarn (e.g., spandex such as Lycra®) incorporated in the stitch yarn for enhanced stretch and shape recovery. The differential thermal elongation of the first and second materials is substantially reversible with low hysteresis. The adjustment to insulation performance of the textile fabric is substantially reversible with relatively low hysteresis.

According to another aspect, a temperature responsive textile fabric garment includes a knit thermal fabric having a first raised surface, towards the wearer's skin, formed of one or more yarns made of multicomponent fibers. The multicomponent fibers include a first fiber component and a second fiber component arranged in a side-by-side configuration. The multicomponent fibers have differing thermal properties, which causes the multicomponent fibers to bend or curl and reversibly recover in response to changes in temperature, thereby adjusting insulative properties of the textile fabric garment. Preferred implementations may include one or more of the following additional features. The knit thermal fabric includes a inner surface, towards the wearer's skin, having one or more regions of raised loop and/or pile yarn. The raised loop and/or pile yarn exhibits changes in bulk of between about 5% to about 50% over a temperature range of between about 32° F. and about 120° F. Preferably, the property of changing bulk as a function of ambient temperature changes is reversible with relatively low hysteresis. The multicomponent fibers exhibit changes in cross-sectional area from between about 5% to about 50% over a temperature range of between about 32° F. and about 120° F. The first and/or second fiber component may be a copolymer or a block polymer. The first and second fiber components may be secured together with physical anchoring. The first and second fiber components can include complementary interlocking surface features adapted to inhibit separation of the first and second materials. The multicomponent fibers include bi-component and/or tri-component fibers. The first fiber component includes a first polymer, and the second fiber component includes a second polymer compatible with the first polymer. The first fiber component includes a first polymer (e.g., polyester), and the second fiber component includes a second polymer (e.g., nylon) non-compatible with the first polymer. The multicomponent fibers can also include a third polymer disposed between the first and second fiber components. The third polymer is compatible with both of the first and second polymers. The multicomponent fibers may include an additive (e.g., silicate, zeolite, titanium dioxide, etc.) physically anchoring the first and second fiber components together. At least one of the first or second fiber components includes a serrated surface. The multicomponent fibers have one or more serrated surfaces. The multicomponent fibers have a substantially rectangular cross-sectional shape. The first and second fiber components have a substantially circular cross-sectional shape. The knit thermal fabric has a second raised surface, opposite the first raised surface, including one or more regions of raised loop and/or pile yarn. The second raised surface includes one or more yarns made of multicomponent fibers.

In yet another aspect, a method of forming a temperature sensitive textile fabric element for use in an engineered thermal fabric garment includes forming a continuous web of yarn and/or fibers including one or more multicomponent fibers. The method also includes finishing a first surface of the continuous web to form one or more regions of loop and/or pile yarn having a predetermined pile height and comprising the one or more multicomponent fibers. The multicomponent fibers are formed of at least a first material and a second material disposed in side-by-side relationship. The first material and the second material exhibit differential thermal elongation, which causes the multicomponent fibers to bend or curl and reversibly recover in response to changes in temperature, thereby adjusting insulation performance of the textile fabric in response to ambient conditions.

Preferred implementations may include one or more of the following additional features. The method may also include finishing a second surface of the continuous web to form one or more other regions of loop and/or pile yarn comprising the multicomponent fibers. The step of forming the continuous web of yarn and/or fiber includes combining yarn and/or fibers by use of electronic needle and/or sinker selection. The step of finishing the first surface of the continuous web to form the one or more regions of loop and/or pile yarn having the predetermined pile height includes forming loops at the technical back of the textile fabric element. The step of forming the continuous web of yarn and/or fibers includes combining yarn and/or fibers, including the one or more multicomponent fibers, by tubular circular knitting. The step of forming the continuous web of yarn and/or fibers includes combining yarn and/or fibers, including the one or more multicomponent fibers, by reverse plating. The step of finishing the first surface includes finishing the first surface to form a single face fleece. The method may also include finishing a second surface of the continuous web to form a double face fleece. The step of forming the continuous web of yarn and/or fibers includes combining yarn and/or fibers, including the one or more multicomponent fibers, by plating. The step of forming the continuous web of yarn and/or fibers includes combining yarn and/or fibers, including the one or more multicomponent fibers, by regular plating; and wherein finishing the first surface further comprises finishing the first surface to form a single face fleece. The step of forming a continuous web of yarn and/or fibers comprises combining yarn and/or fibers, including the one or more multicomponent fibers, by warp knitting (e.g., double needle bar warp knitting, e.g., Raschel warp knitting). In one example, the step of forming a continuous web of yarn and/or fibers comprises combining yarn and/or fibers by Raschel warp knitting and the method includes cutting an interconnecting pile, thereby forming a single face cut pile fabric. In this case, the method may also include raising yarns forming a technical face of the cut pile fabric, thereby forming a double face fabric. The step of forming a continuous web of yarn and/or fibers comprises combining yarn and/or fibers, including the one or more multicomponent fibers, by sliver knitting. The step of finishing the first surface of the continuous web to form one or more regions of loop and/or pile yarn having the predetermined pile height includes raising the first surface. The method may include raising a second surface, opposite the first surface, of the continuous web. The method may also include cutting the loops of the one or more regions of loop and/or pile yarn, and finishing the cut loops to a common pile height. The first material and the second material exhibit differential thermal elongation, e.g., expansion and/or contraction, in response to changes in temperature over a predetermined range of temperature. Preferably, The predetermined range of temperature in 32° F. to 120° F., more preferably, in 50° F. and about 100° F. The method may also include combining the first material and the second material to form the one or more multicomponent fibers. Combining the first material and the second material may include co-extruding the first and second materials. The first and second materials are non-compatible polymers, and combing the first material and the second material may include co-extruding the first and second materials with a third polymer such that the third polymer is disposed between the first and second materials in the multicomponent fiber. The third polymer is compatible with both the first and second materials. Combining the first material and the second material may include physically anchoring the first material to the second material. Physically anchoring the first material to the second material may include adding an additive, such as silicate, zeolite, titanium dioxide, etc., to one or both the first and second materials, wherein the additive is operable bridge between the first and second materials physically or chemically. The first and/or second material may be selected from the group consisting of: polyester, polyurethane, and nylon The one or more regions of loop and/or pile yarn exhibit changes in bulk from between about 5% and about 50% over a temperature range of between about 50° F. and about 100° F. The one or more multicomponent fibers exhibit changes in cross-sectional area from between about 5% and about 50% over a temperature range of between about 50° F. and about 100° F.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
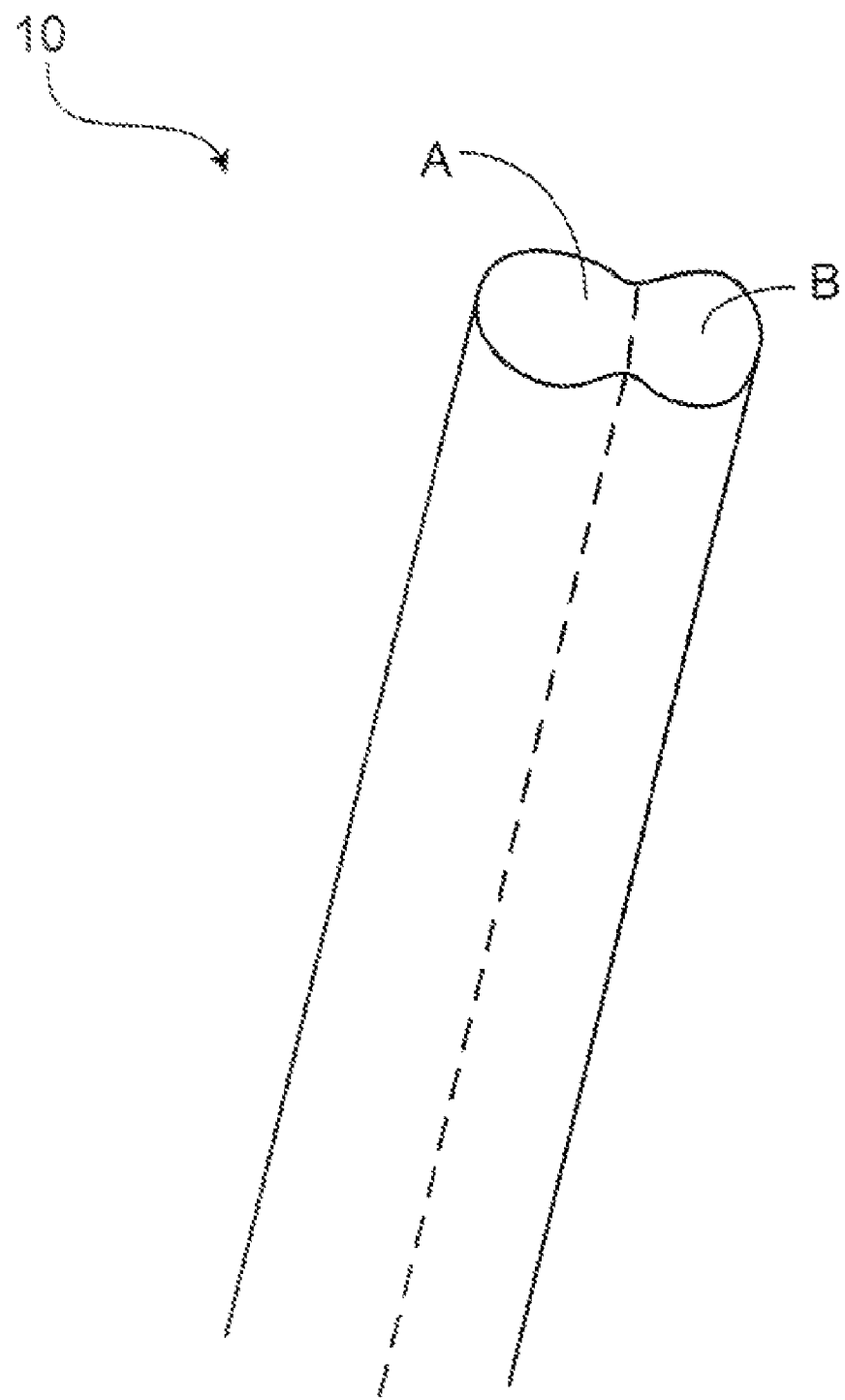
FIGS. 1A-1C are detailed views of a temperature responsive bi-component fiber.

FIG. 1A is a detailed view of a bi-component fiber 10. Fiber component 10 includes two temperature responsive materials, i.e., first and second fiber components A, B arranged in side-by-side relationship. The first and second fiber components A, B exhibit differential thermal elongation, e.g., expansion and or contraction, in response to changes in temperature. As result, the fiber has a tendency to bend and/or curl in response to ambient conditions. Suitable materials for the first and/or second fiber components A, B include polyester, polyurethane, and nylon.

Figure 1B:
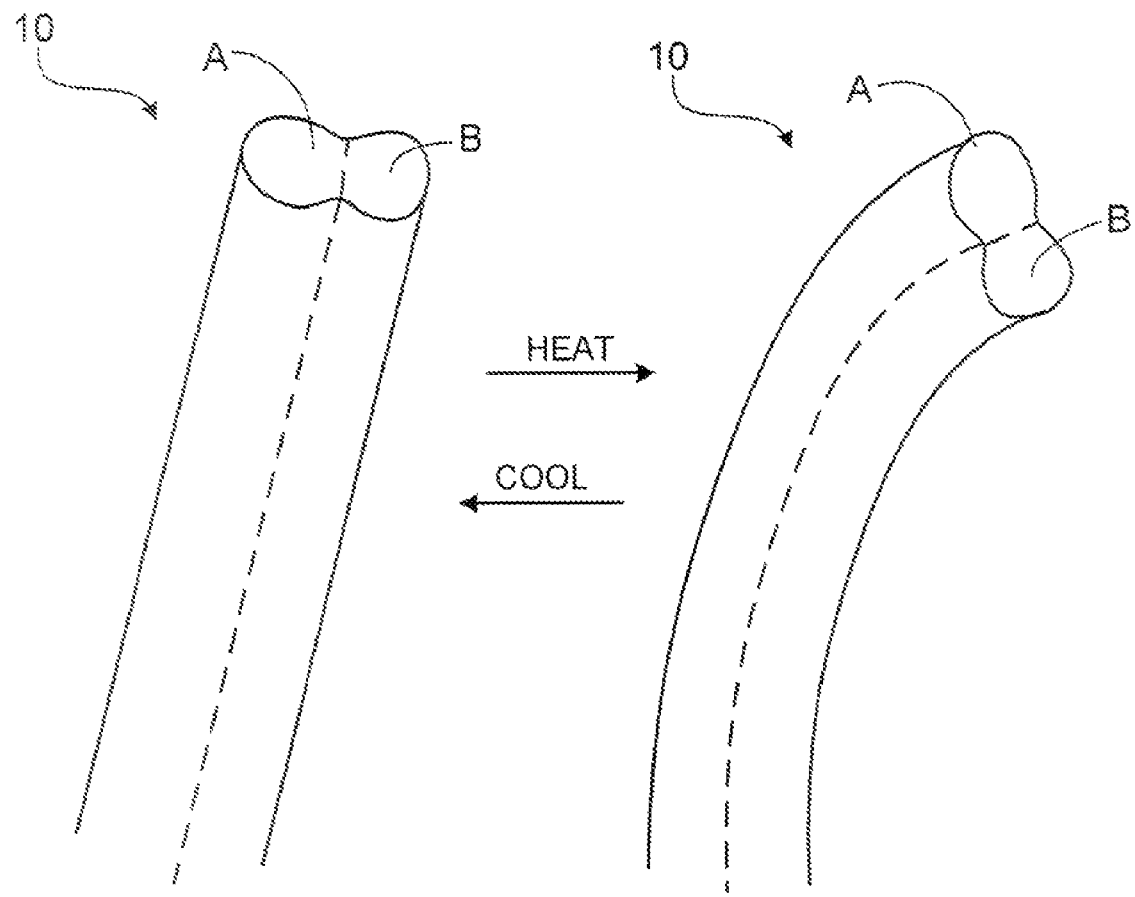
Figure 1C:
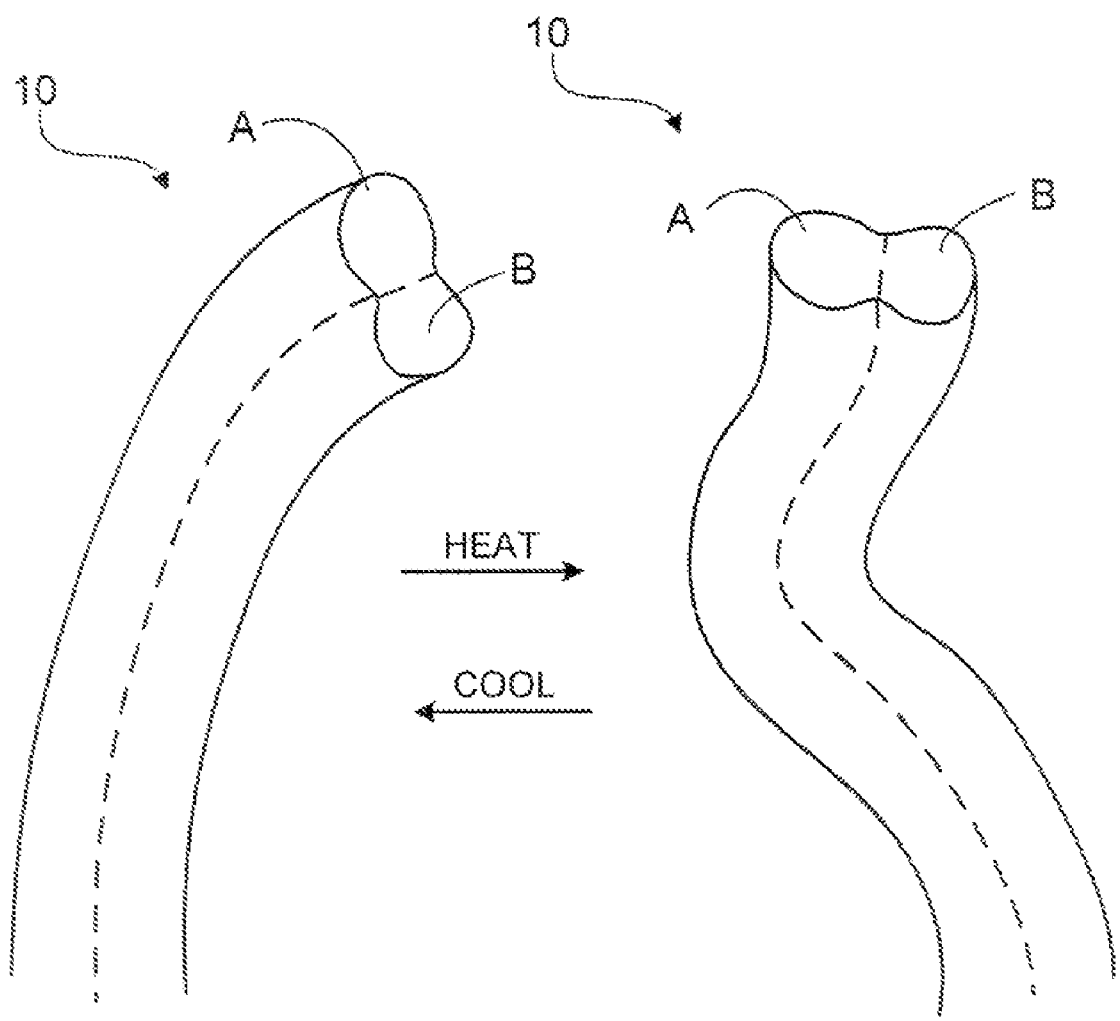

For example, in one embodiment, the first fiber component A has a relatively greater coefficient of thermal expansion (i.e., a greater propensity to grow and/or expand in response to an increase in temperature) than the second fiber component B. When the fiber 10 is exposed to heat over a critical temperature range, the first fiber component A expands at a relatively greater rate than the second fiber component B causing the fiber to bend (see, e.g., FIG. 1B). If the differential elongation (e.g., expansion and/or shrinkage) exceeds a certain threshold level the fiber 10 will tend to curl (see, e.g., FIG. 1C). This process is also reversible with low hysteresis; i.e., the fiber 10 will return toward its original three dimensional configuration once the temperature returns below the critical temperature range. Suitable bi-component fibers of this type are produced by Mide Technologies Corporation of Medford, Mass.

Figure 2A:
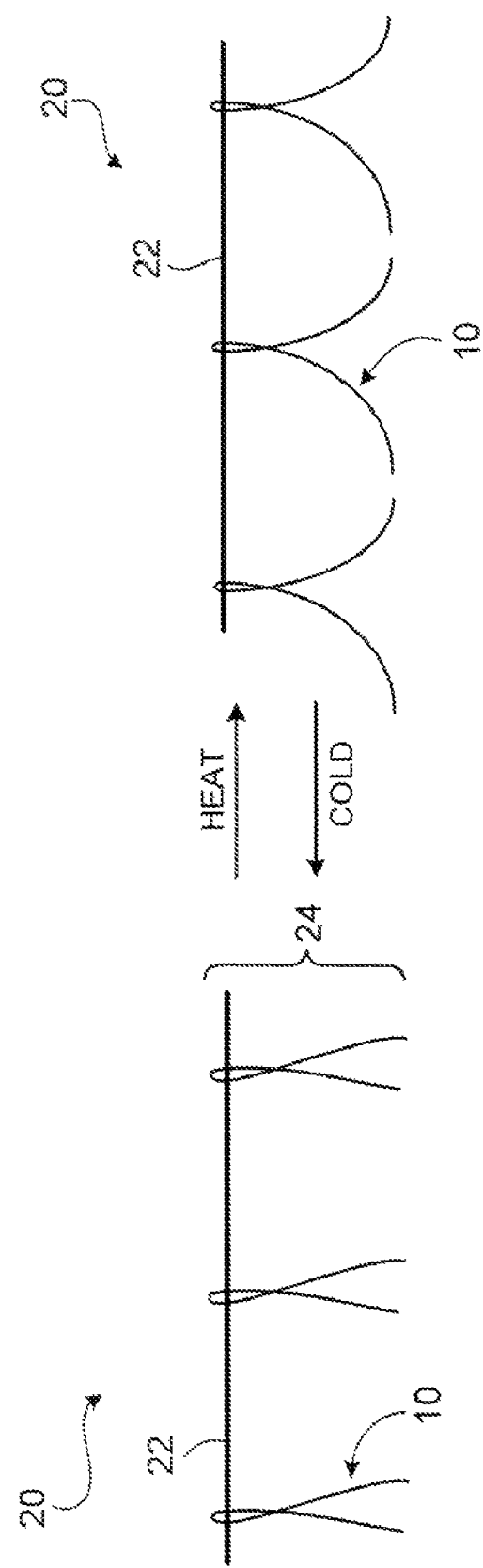
FIGS. 2A-2B are cross-sectional views of temperature responsive smart textile fabric.
Figure 2B:
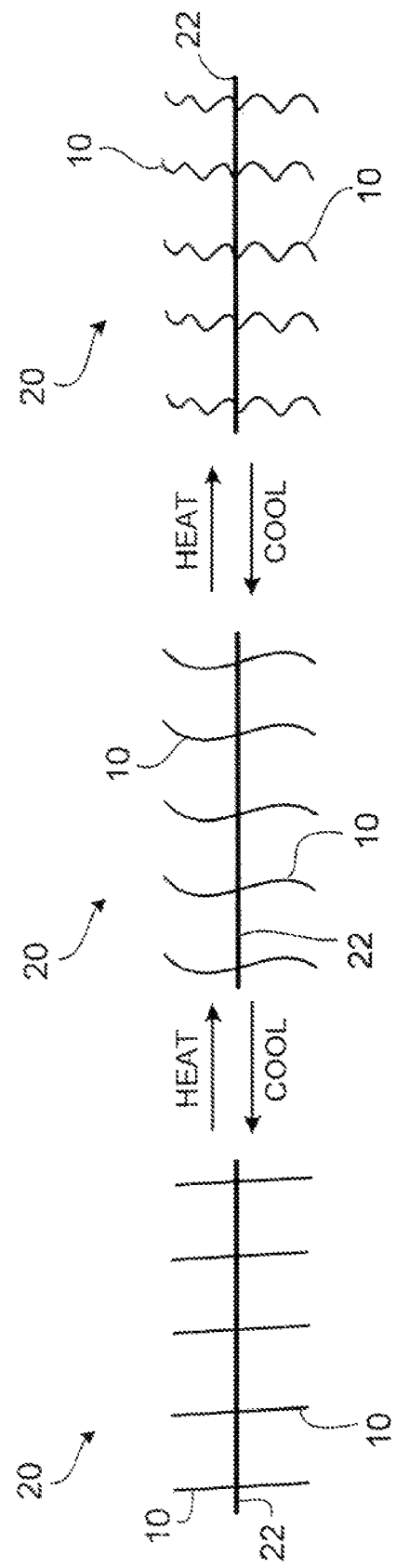

FIG. 2A illustrates a temperature responsive textile fabric 20 including a raised surface of bi-component fibers 10 of the kind described above. The fabric 20 includes a generally sheet-form base 22, preferably of knit construction, having at least one raised surface 24 (e.g., pile yarn in warp knit or special circular knit) including a bi-component fiber 10 (e.g., as a sinker loop yarn, or pile). In any of the foregoing knit constructions, elastomeric yarn may be added (e.g., spandex such as Lycra®) to, e.g., the stitch yarn. For example, in some cases, spandex is incorporated in the stitch yarn for enhanced stretch and shape recovery. As the ambient temperature is increased, the fibers of the raised surface(s) begin to bend and/or curl toward the surface changing the loft and density of the fabric, and, as a result, adjust the insulation performance of the fabric 20. FIG. 2B illustrates the behavioral response of a double face temperature responsive textile fabric.

Figure 3:
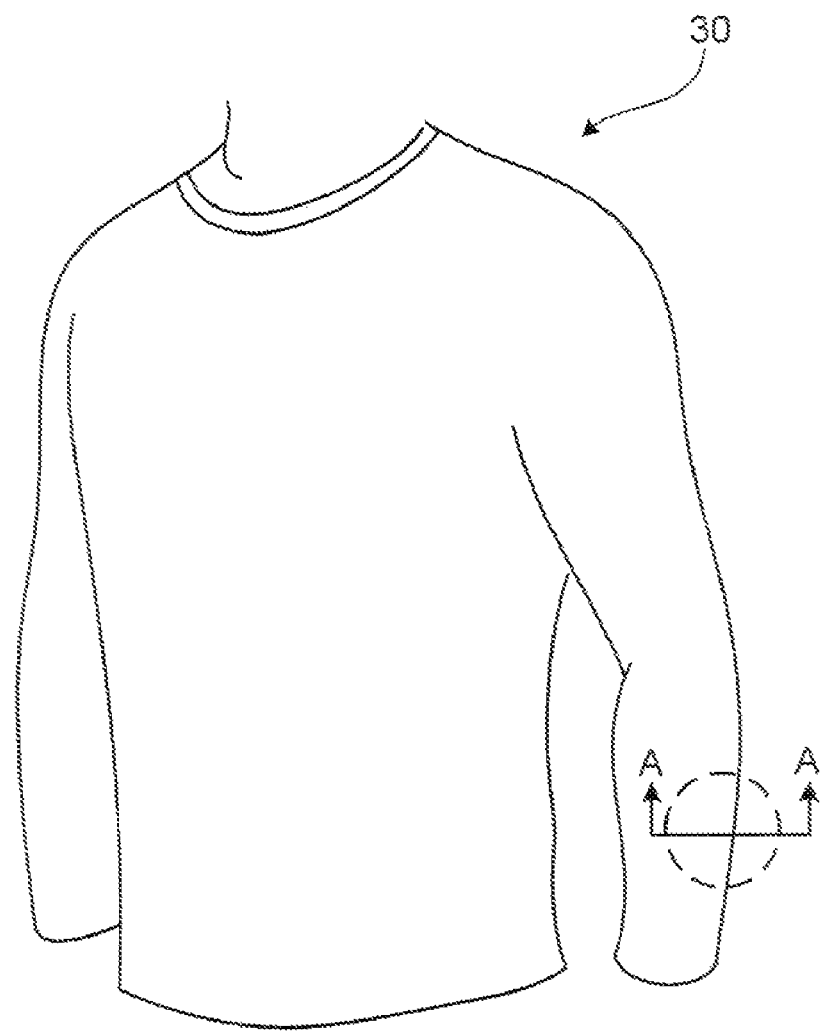
FIG. 3 is a perspective view of temperature responsive smart textile fabric garment.
Figure 3A:
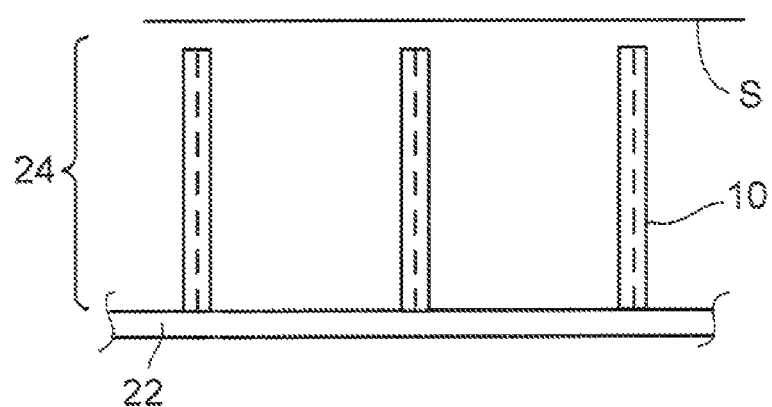
FIGS. 3A-3C are detailed cross-sectional views of a temperature responsive smart textile fabric garment.
Figure 3B:
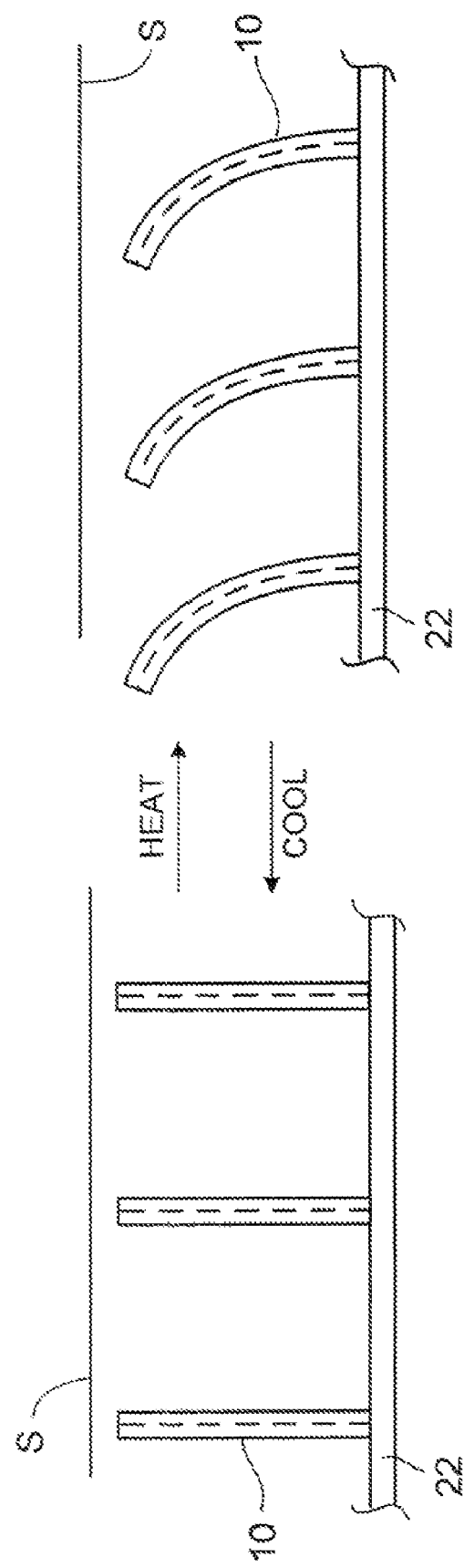
Figure 3C:
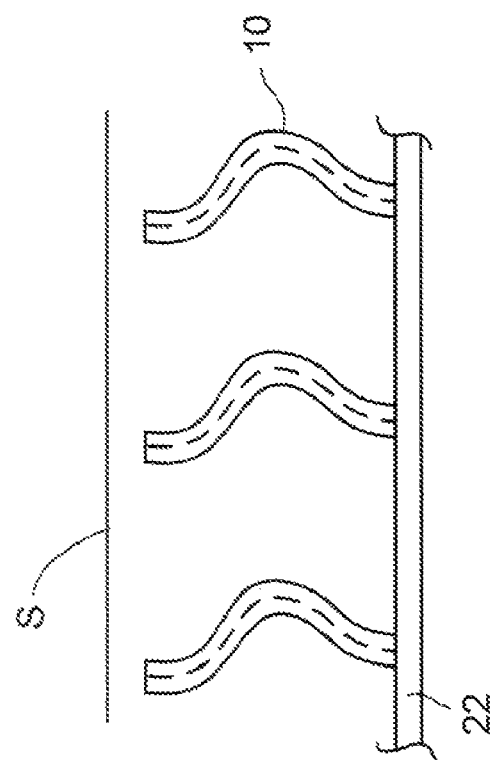
Figure 3C:
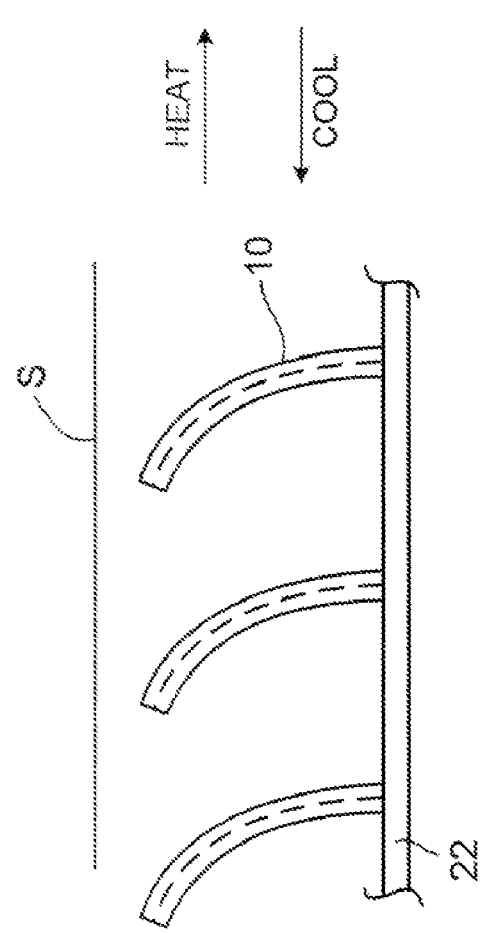

In one example, as shown in FIG. 3, the temperature responsive textile fabric 20 can be incorporated in a fabric garment 30. As illustrated in FIG. 3A, the raised surface 24, including the bi-component fibers 10, contacts the user's skin S providing enhanced comfort, water management, and enhanced air movement and ventilation. As the ambient temperature increases, the fibers of the raised surface begin to bend (FIG. 3B) and curl (FIG. 3C) changing the three dimensional configuration of the fabric, thereby modifying the thermal insulation of the garment; i.e., as the ambient temperature increases the fabric gets thinner (less loft), therefore less insulation, providing enhanced overall comfort.

Preferably, the changes in three dimensional configuration occur over a temperature range of between about 32° F. and about 120° F., more preferably, between about 50° F. and about 100° F.

Figure 4A:
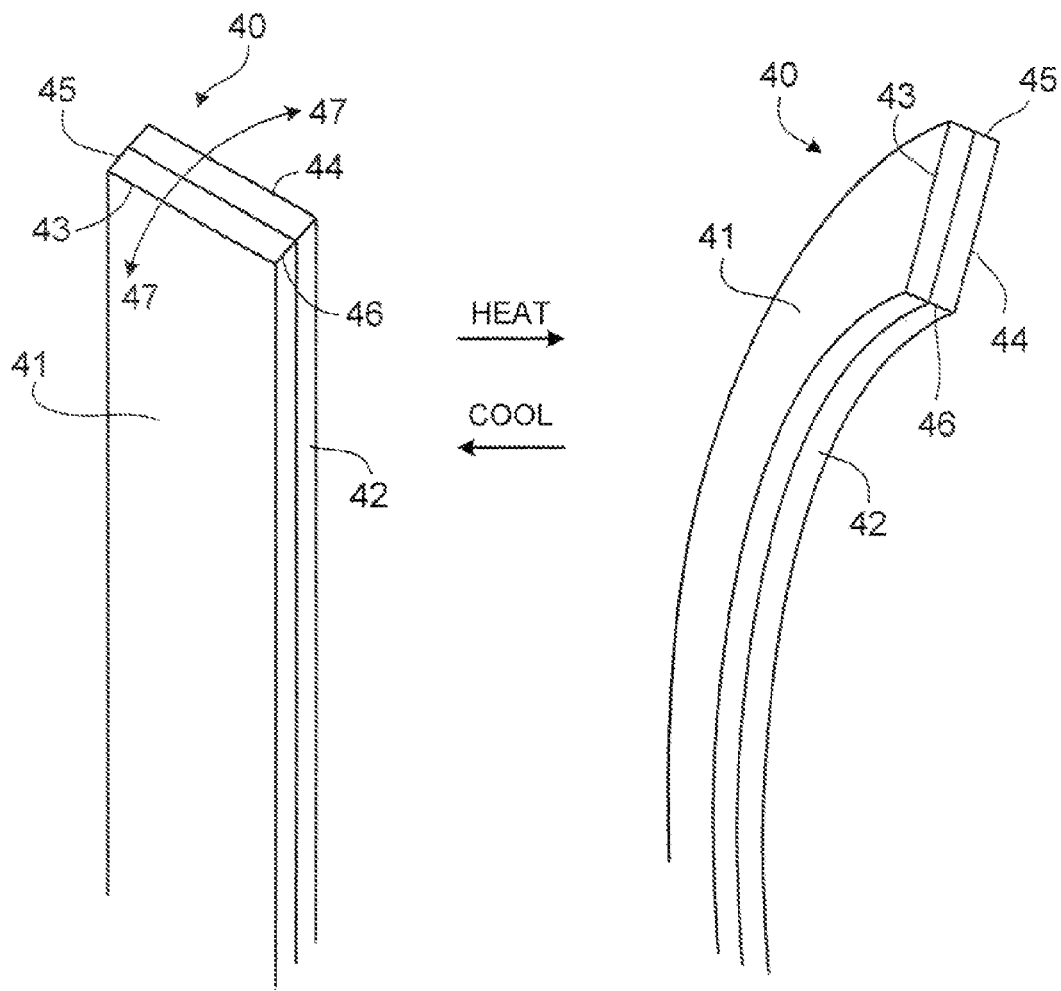
FIGS. 4A and 4B are detailed views of one embodiment of a temperature responsive bi-component fiber having a substantially rectangular cross-sectional shape.
Figure 4B:
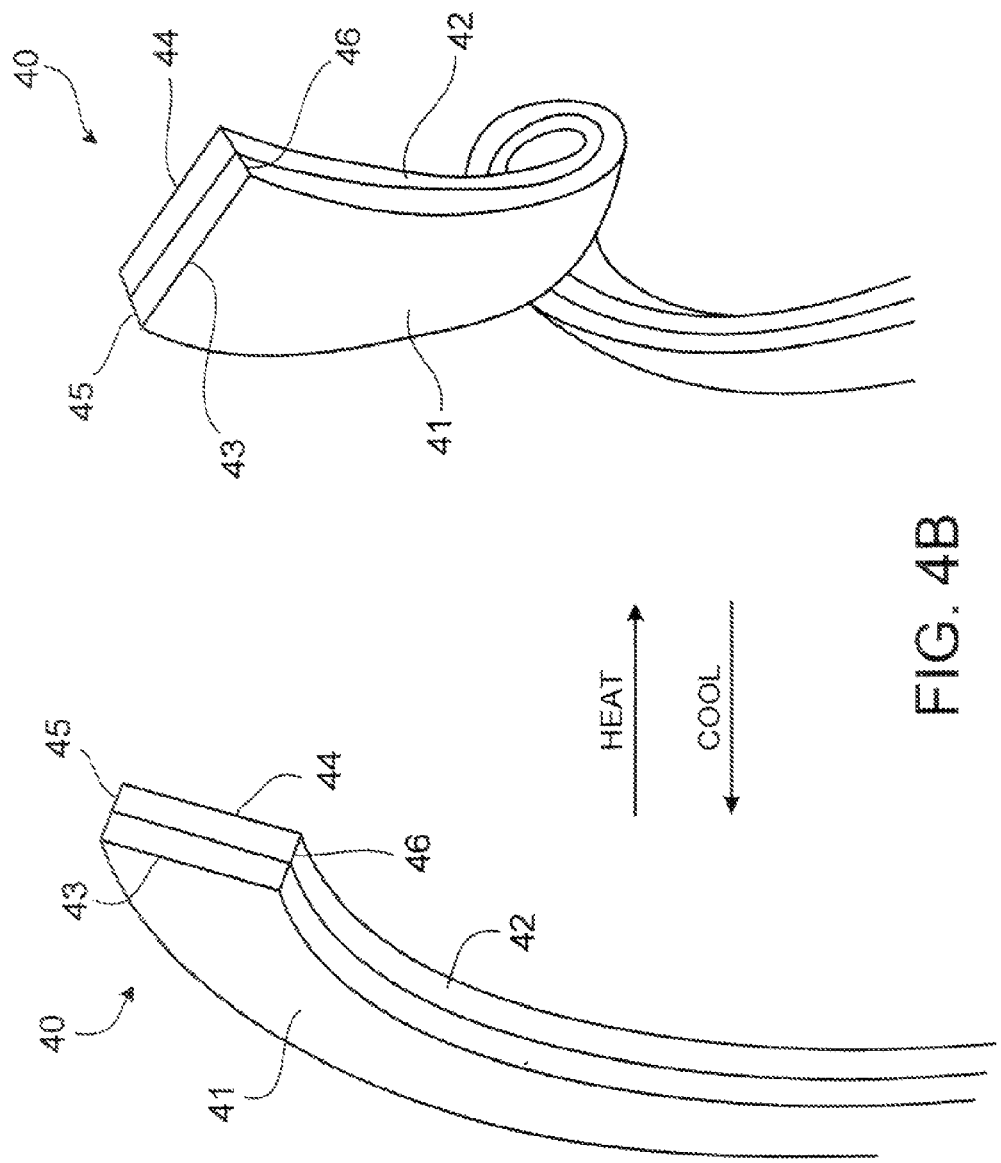

A number of embodiments of the invention have been described. Nevertheless, it will be understood that various modifications may be made without departing from the spirit and scope of the invention. For example, the bi-component fibers may have a variety of cross-sectional shapes. FIG. 4A, for example, illustrates one embodiment of a bi-component fiber 40 having a substantially rectangular cross-section with long sides 43, 44 and short sides 45, 46. The bi-component fiber 40 includes two different polymers, i.e., first and second fiber components 41, 42 arranged in side-by-side relation, which exhibit differential thermal elongation, e.g., expansion and/or contraction, in response to changes in temperature. In this example, the first fiber component 41 has a relatively greater coefficient of thermal expansion than the second fiber component 42. Thus, as with the bi-component fibers described above (e.g., with regard to FIGS. 1A-1C), when the fiber 40 is exposed to heat over a critical temperature range, the first fiber component 41 expands at a relatively greater rate than the second fiber component 42 causing the fiber to bend (see, e.g., FIG. 4A), and, if and/or when the differential elongation (e.g., expansion and/or contraction (shrinkage)) exceeds a certain threshold, the fiber 40 will tend to curl (see, e.g., FIG. 4B). Due to the substantially rectangular cross-sectional shape, the bi-component fiber 40 will tend to bend relatively easily along the long sides 43, 44 (as indicated by arrow 47 in FIG. 4A), e.g., as compared to the short sides 45, 46. This process is also reversible with low hysteresis; i.e., the fiber 40 will return toward its original three dimensional configuration once the temperature returns below the critical temperature range.

Figure 5:
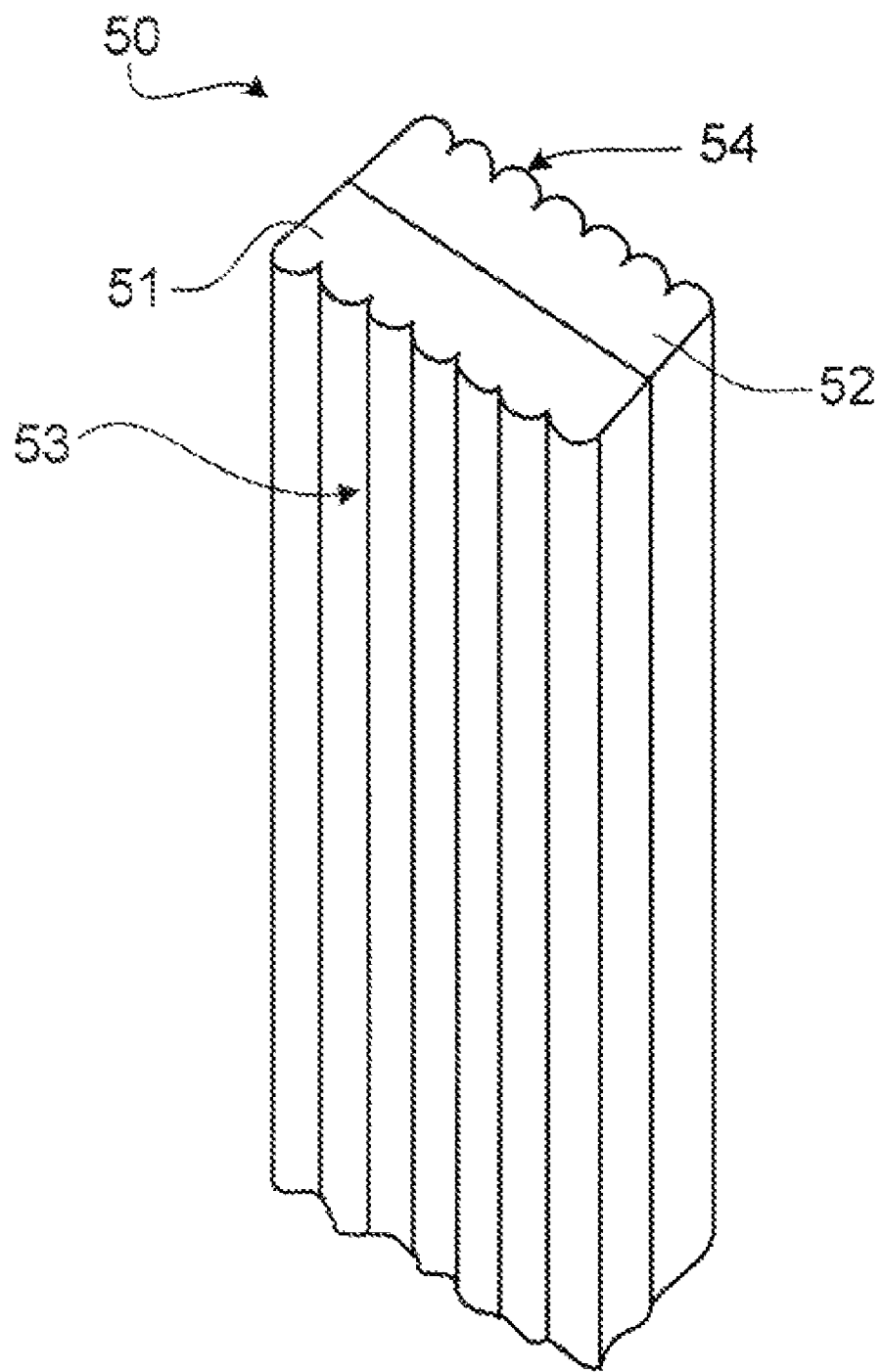
FIG. 5 is a detailed view of a temperature responsive bi-component fiber having serrated surfaces.

The bi-component fibers can have plain surfaces and/or one or more serrated surfaces. For example, FIG. 5 illustrates a bi-component fiber 50 that includes first and second fiber components 51, 52 having serrated surfaces 53, 54. The serrated surfaces can provide a different visual appearance, tactile properties, toughness, and/or light reflectance, e.g., as compared to the plain surfaces illustrated in FIGS. 1A and 4A.

In some embodiments, the bi-component fiber can include two non-compatible polymers (i.e., fiber components) or polymers with poor compatibility such as nylon and polyester. For example, in some cases the bi-component fiber may include nylon and polyester fibers disposed in side-by-side relationship. Fibers formed with non-compatible polymers or polymers with poor compatibility may exhibit a tendency to split; i.e., the individual fiber components may exhibit a tendency to separate, which can alter the effects of the bi-component response to changes in temperature.

Figure 6:
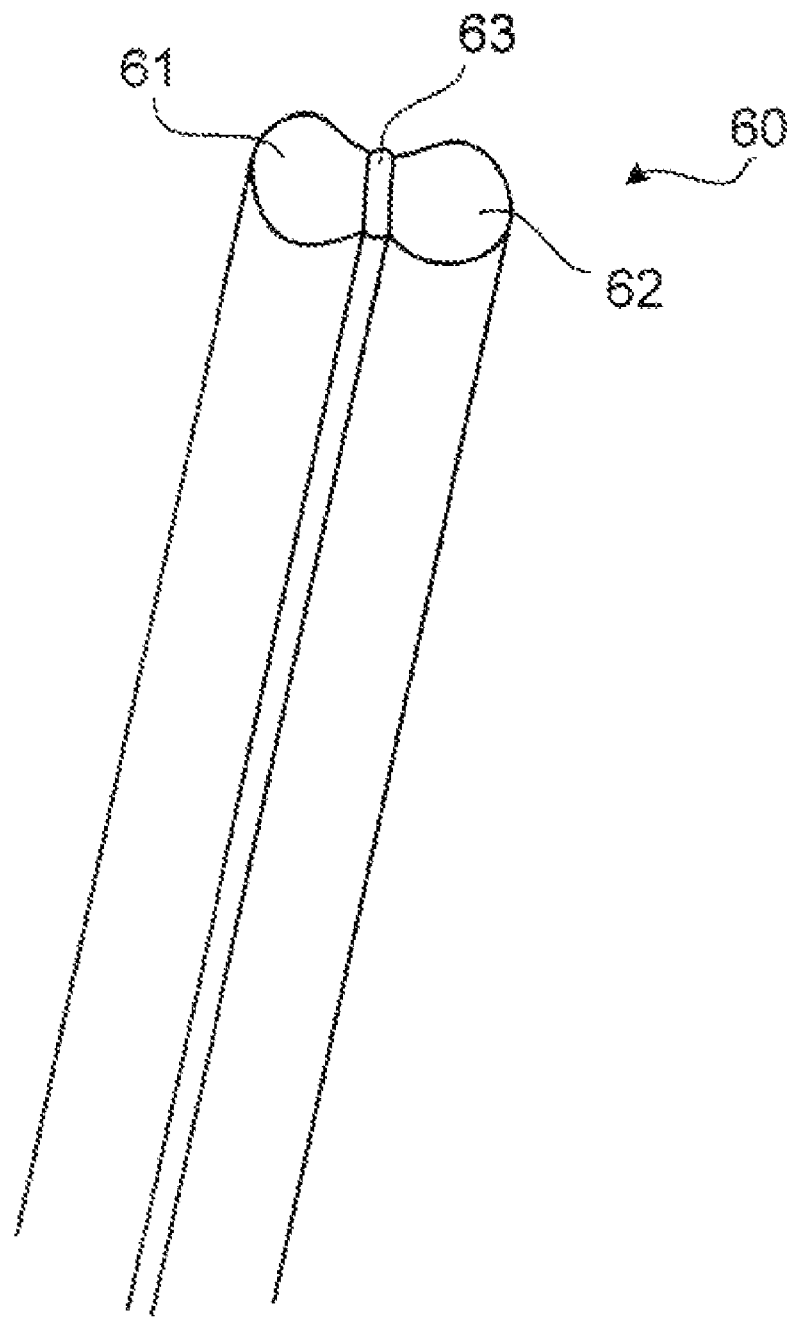
FIGS. 6-9 illustrate various approaches for securing individual fiber components of a multicomponent fiber together.
Figure 7:
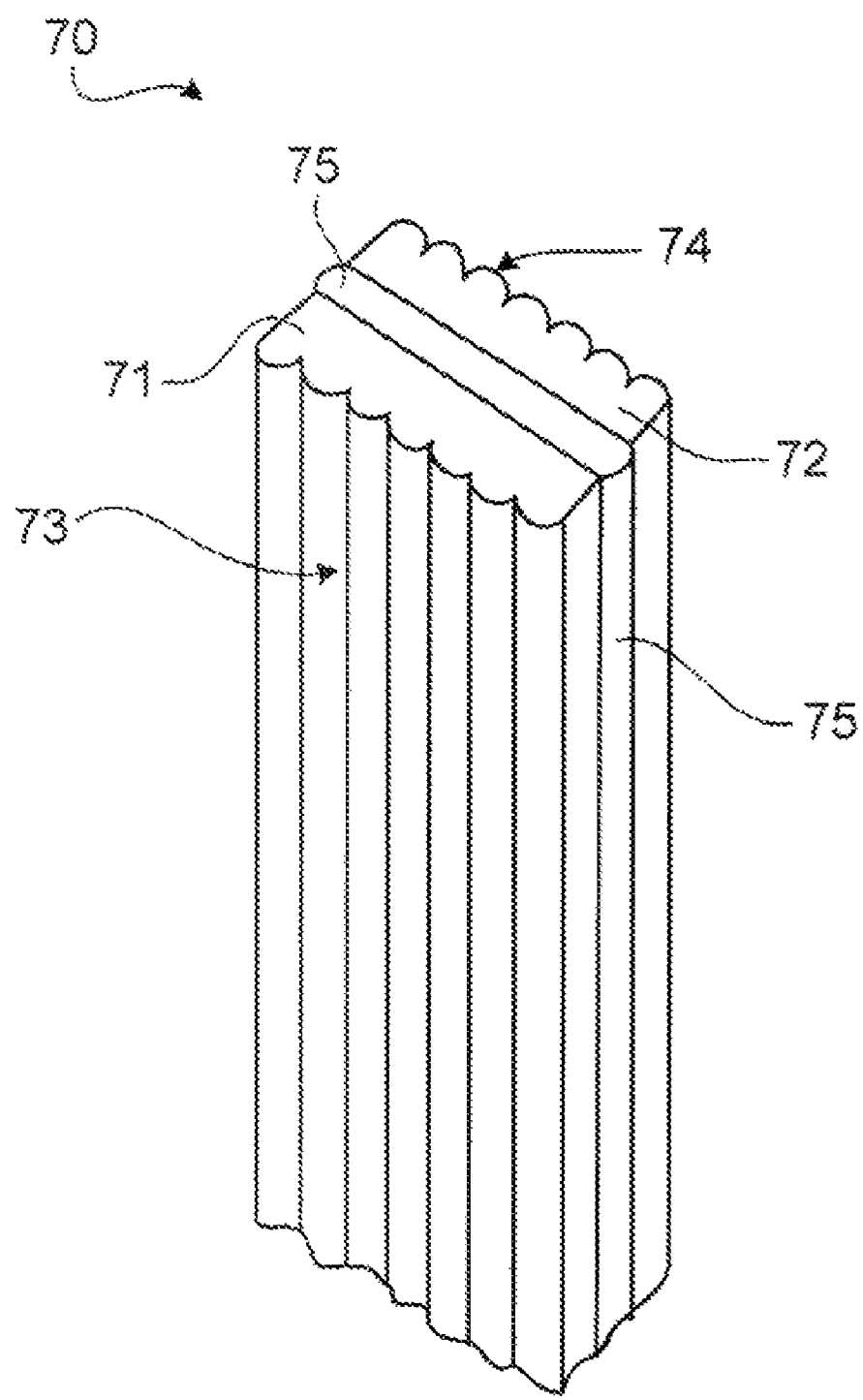

FIGS. 6 and 7 illustrate an approach for inhibiting separation of individual fiber components of a multicomponent fiber. FIG. 6 illustrates the approach as applied to a tri-component fiber 60 that includes first and second fiber components 61, 62 having substantially circular cross-sections. As shown in FIG. 6, a third polymer 63 is disposed between (e.g., co-extruded with) the first and second polymers (i.e., first and second fiber components 61, 62). The third polymer 63 is used as a bridge to aid in securing the first and second polymers together. The third "bridge" polymer 63 can be more compatible with each of the first and second polymers than the first and second polymer are with each other, thereby providing a stronger bond between the first and second polymers and reducing the likelihood of separation.

FIG. 7 illustrates the approach described above with regard to FIG. 6, as applied to a tri-component fiber 70 that includes first and second fiber components 71, 72 having substantially rectangular cross-sections with serrated surfaces 73, 74. As shown in FIG. 7 a third polymer 75 is used as a bridge to secure non-compatible polymers of first and second fibers components 71, 72.

Figure 8:
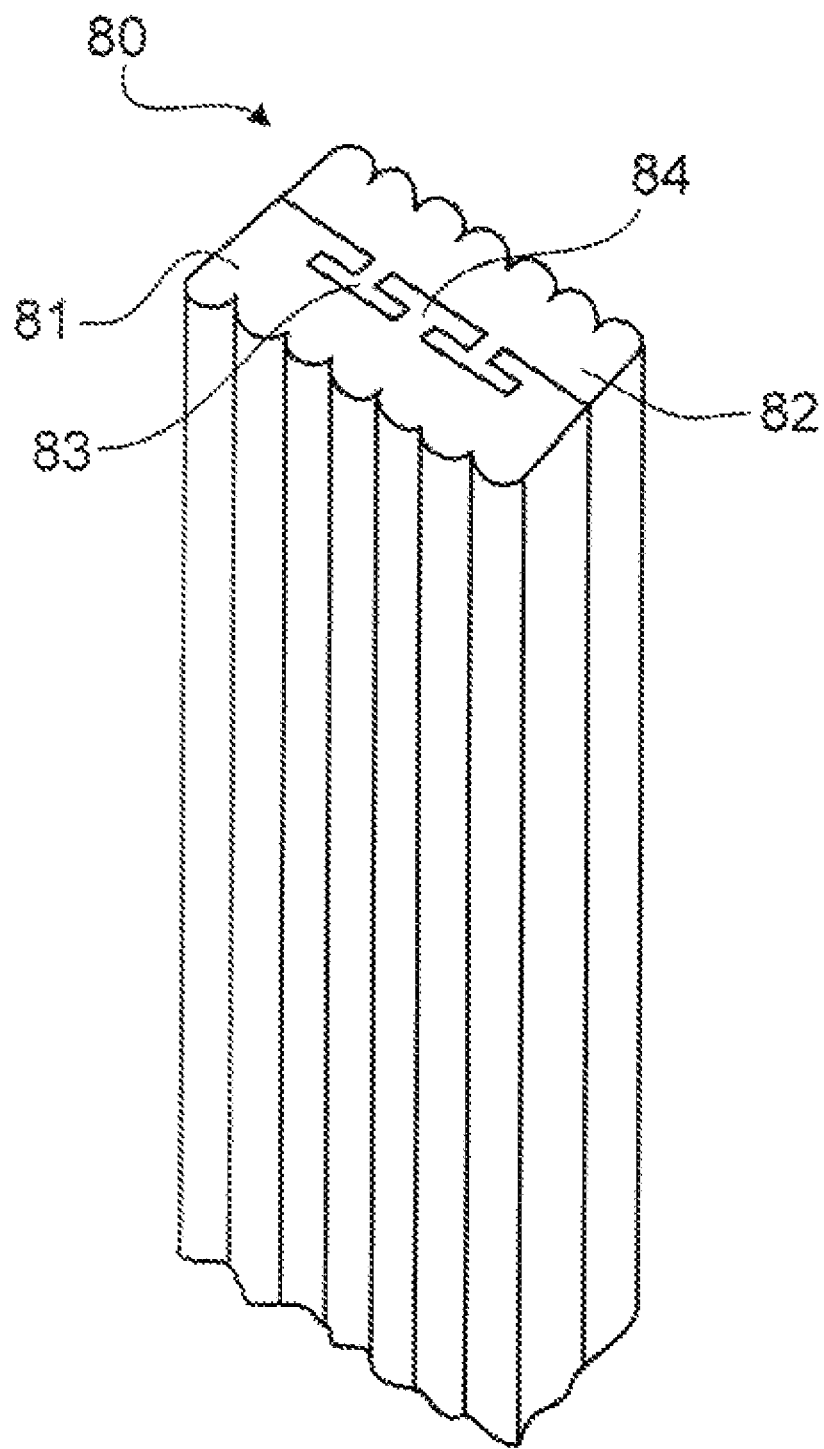
Figure 9:
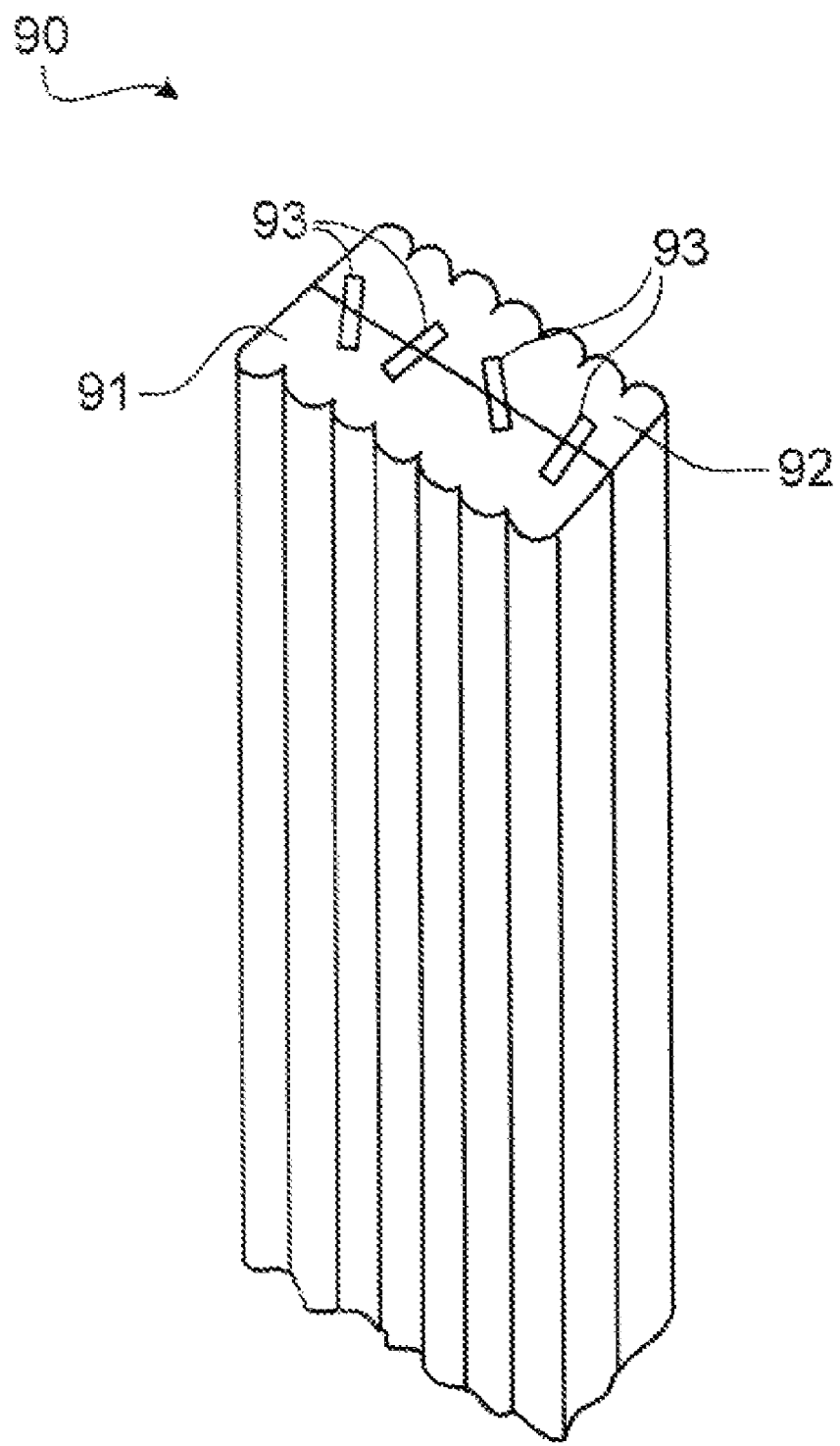

FIGS. 8 and 9 illustrate another approach for inhibiting separation of individual fiber components of a multicomponent fiber, in which the individual fiber components are secured together by physical anchoring. This approach may be used alone or in combination with the approach described above with regard to FIGS. 7 and 8. The physical anchoring can be achieved by providing different, interlocking shapes along mating surfaces at the interface of the fiber components. For example, as shown in FIG. 8, mating surfaces of the first and second fiber components 81, 82 are provided with complementary interlocking features 83, 84 which operate to anchor the first and second polymers together. Alternatively or additionally, as shown for example in FIG. 9, physical anchoring can be achieved by adding an additive 93 (such as silicate, zeolite, titanium dioxide ($TiO_2$), etc.), which will physically or chemically bridge between first and second fiber components 91, 92 of a multicomponent fiber 90, thereby anchoring the fiber components 91, 92 together.

In some implementations, the textile fabric may be produced by any procedure suitable for combining yarns and/or fibers to create a finished fabric having at least one raised surface. The first and second materials of the multicomponent fibers can exhibit differential elongation in response to changes in relative humidity, or changes in level of liquid sweat (e.g., where the temperature responsive fabric is incorporated in a garment). The raised surface can be finished as fleece, velour, pile and/or terry loop. The temperature responsive textile fabric can be incorporated in an insulative layer in a multi-layer garment system. Accordingly, other embodiments are within the scope of the following claims.

What is claimed is:

1. Textile fabric comprising:
    at least one raised surface upon a base, the raised surface incorporating multicomponent fibers formed of at least a first material and a second material disposed in side-by-side relationship, the first material and the second material exhibiting differential thermal elongation to cause the multicomponent fibers to bend and/or curl,
    the multicomponent fibers being configured to bend and/or curl relative to the base, toward a relatively reduced loft of the raised surface, in response to increasing ambient temperature, and
    unbend and/or uncurl relative to the base, toward a relatively increased loft of the raised surface, in response to decreasing ambient temperature,
    thereby reversibly adjusting insulation performance of the textile fabric in response to ambient temperature conditions.

2. The textile fabric of claim 1, wherein the multicomponent fibers comprise extruded fiber components.

3. The textile fabric of claim 2, wherein the multicomponent fibers comprise a pair of co-extruded fiber components.

4. The textile fabric of claim 1, wherein the first material and the second material exhibit differential thermal elongation in response to changes in ambient temperature over a predetermined range of temperature.

5. The textile fabric of claim 4, wherein the predetermined range of temperature is 32° F. to 120° F.

6. The textile fabric of claim 5, wherein the predetermined range of temperature is 50° F. to 100° F.

7. The textile fabric according to claim 1, wherein the at least one raised surface is finished in a form selected from the group consisting of: fleece, velour, shearling, pile, and loop terry.

8. The textile fabric according to claim 1, wherein the textile fabric comprises a knit construction selected from the group consisting of: circular knit construction, single face knit construction, double face knit construction, weft knit construction, and warp knit construction.

9. The textile fabric according to claim 1, comprising a pile fabric having woven or double needle bar Rachel warp knit construction.

10. The textile fabric according to claim 1, wherein the multicomponent fibers comprise bi-component and/or tri-component fibers.

11. The textile fabric according to claim 1, wherein the first material is a first polymer, and wherein the second material is a second polymer relatively compatible with the first polymer.

12. The textile fabric according to claim 1, wherein the first material is a first polymer, and wherein the second material is a second polymer relatively non-compatible with the first polymer.

13. The textile fabric according to claim 1, wherein at least one of the first and second materials comprises a thermoplastic polymer selected from the group consisting of: polyester, polyurethane, and nylon.

14. The textile fabric according to claim 13, wherein the first material is nylon and the second material is polyester.

15. The textile fabric according to 13, wherein the multicomponent fibers further comprise a third material disposed between the first and second materials, wherein the third material is relatively more compatible with each of the first and second materials than the first and second materials are with each other.

16. The textile fabric according to claim 1, wherein the first and second materials include complementary interlocking surface features adapted to inhibit separation of the first and second materials.

17. The textile fabric according to claim 1, wherein said textile fabric has a technical face formed by a stitch yarn and a technical back formed by a loop and/or pile yarn, said loop and/or pile yarn comprising the multicomponent fibers.

18. The textile fabric according to claim 17, wherein the stitch yarn comprises elastomeric yarn for enhanced stretch and shape recovery.

19. The textile fabric according to claim 18, wherein the elastomeric yarn is spandex.

20. The textile fabric according to claim 1, wherein the differential thermal elongation of the first and second materials is substantially reversible with low hysteresis.

21. The textile fabric according to claim 1, wherein the adjustment to insulation performance of the textile fabric is substantially reversible with relatively low hysteresis.

22. A temperature responsive textile fabric garment, comprising:
    a knit thermal fabric having at least a first raised surface upon a base, towards the wearer's skin, formed of one or more yarns made of multicomponent fibers comprising a first fiber component and a second fiber component arranged in a side-by-side configuration,
    said first and second fiber components having relatively different thermal properties to cause the multicomponent fibers to bend and/or curl,
    the multicomponent fibers being configured to bend and/or curl relative to the base, toward a relatively reduced loft of the raised surface, in response to increasing ambient temperature, and to unbend and/or uncurl relative to the base, toward a relatively increased loft of the raised surface, in response to decreasing ambient temperature,
    thereby reversibly adjusting insulation performance of the textile fabric in response to ambient temperature conditions.

23. The textile fabric garment according to claim 22, wherein the knit thermal fabric has an inner surface, towards the wearer's skin, including one or more regions of raised loop and/or pile yarn.

24. The textile fabric garment according to claim 23, wherein the raised loop and/or pile yarn exhibits changes in bulk of between about 5% to about 50% over a temperature range of between about 32° F. and about 120° F.

25. The textile fabric garment according to claim 22, wherein the multicomponent fibers exhibit changes in cross-sectional area from between about 5% to about 50% over a temperature range of between about 32° F. and about 120° F.

26. The textile fabric garment according to claim 22, wherein at least one of the first and second fiber components comprises a copolymer.

27. The textile fabric garment according to claim 22, wherein at least one of the first and second fiber components comprises a block polymer.

28. The textile fabric garment according to claim 22, wherein the first and second fiber components are secured together with physical anchoring.

29. The textile fabric garment according to claim 28, wherein the first and second fiber components include complementary interlocking surface features adapted to inhibit separation of the first and second materials.

30. The textile fabric garment according to claim 22, wherein the multicomponent fibers comprise bi-component and/or tri-component fibers.

31. The textile fabric garment according to claim 22, wherein the first fiber component comprises a first polymer, and wherein the second fiber component comprises a second polymer relatively compatible with the first polymer.

32. The textile fabric garment according to claim 22, wherein the first fiber component comprises a first polymer, and wherein the second fiber component comprises a second polymer relatively non-compatible with the first polymer.

33. The textile fabric garment according to claim 32, wherein the first polymer is polyester and the second polymer is nylon.

34. The textile fabric garment according to claim 32, wherein the multicomponent fibers further comprise a third polymer disposed between the first and second fiber components, wherein the third polymer is relatively compatible with each of the first and second polymers.

35. The textile fabric garment according to claim 32, wherein the multicomponent fibers further comprise an additive physically anchoring the first and second fiber components together.

36. The textile fabric garment according to claim 35, wherein the additive is selected from the group consisting of: silicate, zeolite, and titanium dioxide.

37. The textile fabric garment according to claim 22, wherein at least one of the first or second fiber components defines a serrated surface.

38. The textile fabric garment according to claim 22, wherein the multicomponent fibers define one or more serrated surfaces.

39. The textile fabric garment according to claim 22, wherein the multicomponent fibers have a substantially rectangular cross-sectional shape.

40. The textile fabric garment according to claim 22, wherein both of the first and second fiber components have a substantially circular cross-sectional shape.

41. The textile fabric garment according to claim 22, wherein the knit thermal fabric further comprises a second raised surface, opposite the first raised surface, including one or more regions of raised loop and/or pile yarn.

42. The textile fabric garment according to claim 41, wherein the second raised surface comprises one or more yarns made of multicomponent fibers.

43. A method of forming a temperature sensitive textile fabric element for use in an engineered thermal fabric garment, the method comprising:
forming a continuous web of yarn and/or fibers including one or more multicomponent fibers;
finishing at least a first surface of the continuous web to form one or more regions of loop and/or pile yarn having a predetermined pile height upon a base, and comprising the one or more multicomponent fibers, said multicomponent fibers formed of at least a first material and a second material disposed in side-by-side relationship, the first material and the second material exhibiting differential thermal elongation to cause the multicomponent fibers to bend and/or curl, the multicomponent fibers being configured to bend and/or curl relative to the base, toward a relatively reduced loft of the regions of loop and/or pile yarn, in response to increasing ambient temperature, and to unbend and/or uncurl relative to the base, toward a relatively increased loft of the regions of loop and/or pile yarn in response to decreasing ambient temperature, thereby reversibly adjusting insulation performance of the textile fabric in response to ambient temperature conditions.

44. The method according to claim 43, further comprising finishing a second surface of the continuous web to form one or more other regions of loop and/or pile yarn comprising the multicomponent fibers.

45. The method according to claim 43, wherein forming the continuous web of yarn and/or fiber comprises combining yarn and/or fibers by use of electronic needle and/or sinker selection.

46. The method according to claim 43, wherein finishing at least the first surface of the continuous web to form the one or more regions of loop and/or pile yarn having the predetermined pile height comprises forming loops at the technical back of the textile fabric element.

47. The method according to claim 43, wherein forming the continuous web of yarn and/or fibers comprises combining yarn and/or fibers, including the one or more multicomponent fibers, by tubular circular knitting.

48. The method according to claim 43, wherein forming the continuous web of yarn and/or fibers comprises combining yarn and/or fibers, including the one or more multicomponent fibers, by reverse plating.

49. The method according to claim 48, wherein finishing at least the first surface further comprises finishing the first surface to form a single face fleece.

50. The method according to claim 49, further comprising finishing a second surface of the continuous web to form a double face fleece.

51. The method according to claim 43, wherein forming the continuous web of yarn and/or fibers comprises combining yarn and/or fibers, including the one or more multicomponent fibers, by plating.

52. The method according to claim 43, wherein forming the continuous web of yarn and/or fibers comprises combining yarn and/or fibers, including the one or more multicomponent fibers, by regular plating; and wherein finishing the first surface further comprises finishing the first surface to form a single face fleece.

53. The method according to claim 43, wherein forming a continuous web of yarn and/or fibers comprises combining yarn and/or fibers, including the one or more multicomponent fibers, by warp knitting.

54. The method according to claim 43, wherein the step of forming the continuous web of yarn and/or fibers comprises double needle bar warp knitting.

55. The method according to claim 43, wherein the step of forming the continuous web of yarn and/or fibers comprises Raschel warp knitting.

56. The method according to claim 55, further comprising cutting an interconnecting pile, thereby forming a single face cut pile fabric.

57. The method according to claim 56, further comprising raising yarns forming a technical face of the cut pile fabric, thereby forming a double face fabric.

58. The method according to claim 43, wherein the step of forming the continuous web of yarn and/or fibers comprises sliver knitting.

59. The method according to claim 43, wherein finishing at least the first surface of the continuous web to form one or more regions of loop and/or pile yarn having the predetermined pile height comprises raising the first surface.

60. The method according the claim 59, further comprising raising a second surface, opposite the first surface, of the continuous web.

61. The method according to claim 43, further comprising cutting the loops of the one or more regions of loop and/or pile yarn.

62. The method according to claim 61, further comprising finishing the cut loops to a common pile height.

63. The method according to claim 43, wherein the first material and the second material exhibit differential thermal elongation in response to changes in temperature over a predetermined range of temperature.

64. The method according to claim 63, wherein the predetermined range of temperature in 32° F. to 120° F.

65. The method according to claim 64, wherein the predetermined range of temperature in 50° F. and about 100° F.

66. The method according to claim 43, further comprising combining the first material and the second material to form the one or more multicomponent fibers.

67. The method according to claim 66, wherein combining the first material and the second material includes co-extruding the first and second materials.

68. The method according to claim 66, wherein the first and second materials are relatively non-compatible polymers, and wherein combining the first material and the second material comprises co-extruding the first and second materials with a third material such that the third material is disposed between the first and second materials in the multicomponent fiber.

69. The method according to claim 68, wherein the third material is relatively compatible with each of the first and second materials.

70. The method according to claim 66, wherein combining the first material and the second material comprises physically anchoring the first material to the second material.

71. The method according to claim 70, wherein physically anchoring the first material to the second material comprises adding an additive to one or both the first and second materials, wherein the additive is operable to bridge between the first and second materials physically or chemically.

72. The method according to claim 71, wherein the additive is selected from the group consisting of: silicate, zeolite, and titanium dioxide.

73. The method according to claim 43, wherein at least one of the first and second materials is selected from the group consisting of: polyester, polyurethane, and nylon.

74. The method according to claim 43, wherein the one or more regions of loop and/or pile yarn exhibit changes in bulk from between about 5% and about 50% over a temperature range of between about 50° F. and about 100° F.

75. The method according to claim 43, wherein the one or more multicomponent fibers exhibit changes in cross-sectional area from between about 5% and about 50% over a temperature range of between about 50° F. and about 100° F.

* * * * *

UNITED STATES PATENT AND TRADEMARK OFFICE
CERTIFICATE OF CORRECTION

PATENT NO. : 8,192,824 B2
APPLICATION NO. : 11/835632
DATED : June 5, 2012
INVENTOR(S) : Moshe Rock It is certified that error appears in the above-identified patent and that said Letters Patent is hereby corrected as shown below:

IN THE CLAIMS:

Column 8, Claim 15, line 1:
Delete "according to 13" and insert --according to claim 13--

Column 10, claim 60, line 65:
Delete "according the claim" and insert --according to the claim--

Signed and Sealed this
Seventh Day of August, 2012

David J. Kappos
*Director of the United States Patent and Trademark Office*